United States Patent [19]
Fritts

[11] 4,022,952
[45] May 10, 1977

[54] ELECTRODE ASSEMBLY FOR BIPOLAR BATTERY

[75] Inventor: David H. Fritts, Dayton, Ohio

[73] Assignee: The United States of America as represented by the Secretary of the Air Force, Washington, D.C.

[22] Filed: Dec. 19, 1975

[21] Appl. No.: 642,524

[52] U.S. Cl. .................................. 429/210; 204/268
[51] Int. Cl.² .......................................... H01M 6/48
[58] Field of Search ................................ 136/10–12, 136/20, 30, 125, 130; 204/254, 268; 429/210

[56] References Cited
UNITED STATES PATENTS 3,207,631  9/1965  Zaromb .............................. 136/10

Primary Examiner—C. F. LeFevour
Attorney, Agent, or Firm—Joseph E. Rusz; Robert Kern Duncan

[57] ABSTRACT

A bipolar electrode having, between active materials, a heat sink fabricated from a porous electrical and heat conductive material, such as sintered silver, and impregnating the porous material with a phase-change heat absorbent material having a high heat of fusion, such as beeswax, provides an electrode having a very large thermal capacity for a high discharge current density battery.

2 Claims, 2 Drawing Figures

ELECTRODE ASSEMBLY FOR BIPOLAR BATTERY

RIGHTS OF THE GOVERNMENT

The invention described herein may be manufactured and used by or for the Government of the United States for all governmental purposes without the payment of any royalty.

BACKGROUND OF THE INVENTION

The field of the invention is in the battery art and particularly in the art of batteries suitable for high discharge current densities.

A bipolar battery, also known as pile type battery, generally contains many cells, and in the bipolar battery there are inner cell connectors each of which consists of a sheet of metal sealed into the cell case at least on each side and on the bottom. On one side of these inner cell connectors, or bipolar electrodes, is the positive active material and on the other side is the negative active material. A number of these units or bipolar electrodes are assembled in series with separators containing the electrolyte positioned between them to form a bipolar battery.

The problem of dissipating or removing the heat from high discharge density batteries, and particularly bipolar batteries, has been a serious problem. Internal and external cooling schemes have been used utilizing various coolant mediums and heat sinks. All have tended to be bulky, heavy, complicated, and presented difficulties in sealing and insulating. Typical battery prior art of interest in this invention is exemplified by U.S. Pat. No. 3,207,631 to patentee S. Zaromb, U.S. Pat. No. 3,556,855 to patentee E. Howells, and U.S. Pat. No. 3,694,266 to patentees B. Bergun et al.

SUMMARY OF THE INVENTION

A bipolar electrode that is easily constructed, that is not flexible, which can be readily handled and assembled without shedding active materials, which contains a heat sink that prevents overheating during long, high-rate discharges or during discharges at extremely high rates is disclosed that provides an improved bipolar battery.

DESCRIPTION OF THE PREFERRED EMBODIMENT

The voltage of a bipolar battery is determined by the number of cells that it contains. The cells are generally connected in series. Thus, the voltage of the battery is the number of cells times the individual cell potential. Generally a saving of space and weight, for a given voltage, may be achieved by placing a number of cells, using bipolar construction, in one case rather than by externally connecting in series the same number of cells, each having their own cell case. The inner cell connectors may be made very thin and the current density distribution over the face of the electrode can be kept as even as desired by making just the two end electrodes with a sufficiently thick grid. Thus, much of the grid weight can be eliminated at a considerable saving in overall battery weight. However, in conventional construction, difficulties in overheating soon overcome the advantages gained by the foregoing in size and weight. With many prior cooling methods sealing of the bipolar electrode has been a problem. If there is any leakage of electrolyte past the inner cell connector it is equivalent to a short and the potential and capacity of the battery will be drastically reduced. Another major problem with the conventional bipolar electrode occurs when attempting to minimize weight and the inner cell connector is made as thin as possible, and that is it becomes flexible and the active material tends to fall off of it as it is put through the various charging operations and during assembly.

Figure 1:
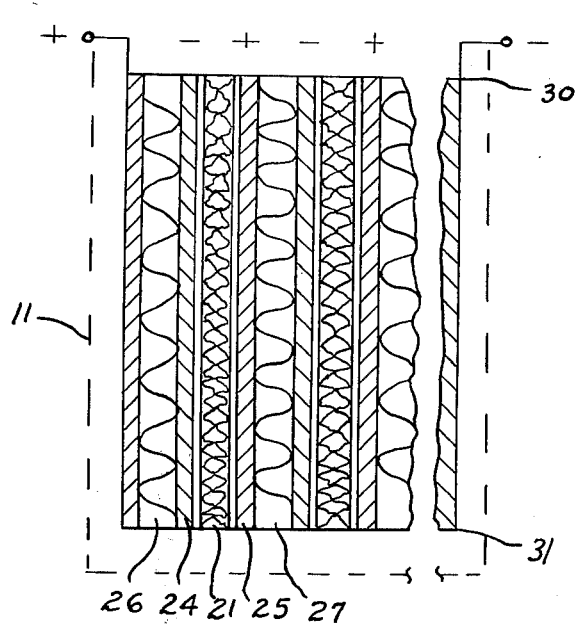
FIG. 1 illustrates schematically a bipolar battery having the improved bipolar electrode module disclosed herein.
Figure 2:
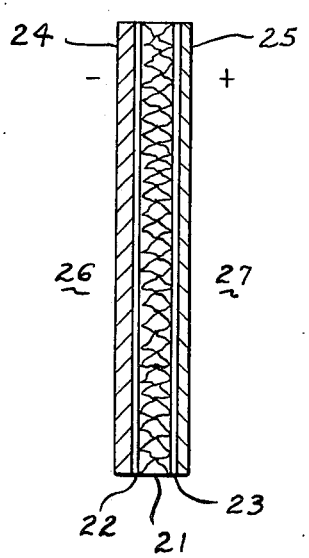
FIG. 2 schematically illustrates a typical bipolar electrode module.

This invention is a heat absorbing bipolar electrode. It may be considered a module of a bipolar battery, one face of which is an anode of one cell and the other face is the cathode of the next adjacent cell. The space in between the anode face and the cathode face is filled with a reticulated, or a wire, or a honeycomb, network of porous metal whose interstices are filled with a high heat absorbant material. Referring to FIG. 1, which depicts a portion of a battery, which may typically be a silveroxide-zinc battery with potassium hydroxide electrolyte, sealed in a cell case 11. A single bipolar electrode module typical of an embodiment of the invention is shown in FIG. 2. The porous metal network 21 is connected to the thin metal grids 22 and 23. The grids 22 and 23 support the active materials 24 and 25 of the bipolar electrode and are also electron conductors which along with porous metal matrix 21 electrically connect the cathode 24 of cell 26 to the anode 25 of cell 27. The grids also are heat conductors conducting the heat formed at the active faces of the bipolar electrode, during the electrochemical reaction, to the porous metal matrix and the heat absorbing material contained therein.

The porous metal matrix 21 between the grids in the module may be fabricated of any suitable metal that will conduct electricity and heat and be compatible with the heat sink material. Silver and copper are generally suitable materials, with the former generally preferred. The thin metal grids 22 and 23 are also typically fabricated from silver sheet. The metal from which the grids are fabricated should not enter into or interfere with the electrochemical reaction of the cell. The heat sink material impregnating the porous matrix 21 preferably should be a thermal phase-change material with a high heat of fusion and melt at a temperature slightly lower than the battery limiting temperature. Beeswax is a typical phasechange material that is generally suitable as a heat sink material for many applications of silver-zinc batteries and other batteries. The beeswax has a relatively high heat of fusion and a melting temperature of approximately 143° F, thus, the cell temperature will remain approximately at this value as heat energy is flowing into the beeswax until the complete liquification of the wax. Thus, batteries constructed using the bipolar electrode as disclosed herein will remain at a constant temperature as they are discharged at a high rate instead of the temperature progressively continuing to climb higher and higher as in the conventional battery. Discharge rates of limited duration, (until the complete melting of the phase-change material occurs), can be achieved with batteries constructed using this new bipolar electrode that cannot be obtained with similar batteries of conventional construction. Conventional batteries will overheat to their destruction with current pulses that will not damage batteries having this novel heat sink bipolar electrode. Waxes other than beeswax may be used. The criteria for determining a particular wax most suitable for a particular battery are its melting temperature and its heat of fusion. In addition to beeswax that has a melting temperature of approximately 143° F and a heat of fusion of 76 Btu per pound, paraffin wax (130° F, 63 Btu per pound), Napthol wax (205° F, 70 Btu per pound), and other phase-change materials may be used. The grids 22 and 23 seal the ends of the porous metal matrix, provide a supporting material for the active electrodes materials and also provide electrical and thermal connection between the electrodes and the matrix containing the heat sink material. They may be fabricated of any suitable metal such as silver which does not enter into or interfere with the electrochemical reaction during charge or discharge.

The active materials and electrolyte are conventional items and can be that of any suitable system for a primary or secondary cell. While a battery built from these modules as disclosed herein can be discharged in a normal manner, it is particularly suited for discharges at extremely high rates for relatively short times. Consequently a suitable battery system would be the silver-zinc wherein the positive active material 25 would be AgO; the negative active material 24 would be Zn, and the electrolyte 26 and 27 would be KOH. The active materials are applied to the grid surfaces by any suitable conventional method such as pasting, sintering or electrodeposition. The cell (and battery) elements containing the heat sink modules of this invention are conventionally assembled in a pile with suitable separators, such as cellophane for the AgO-Zn-KOH system, between each module to form an individual cell of a battery system. The system is conventionally sealed in conventional cell case 11 using conventional sealing and insulating techniques at the upper and lower ends, 30 and 31, respectively, of the pile. In some battery designs the electrolyte is preferably added to each cell separator after sealing in the cell case but prior to sealing the top of the case. In other designs the electrolyte is placed in the separators before their assembly with the bipolar electrodes.

The method of preparation of an electrode assembly will depend on the particular battery system that is involved. A typical assembly technique for forming the heat sink module as shown in FIG. 2 for a AgO-Zn-KOH system is to start with a relatively thin sheet of porous metal matrix 21, such as silver, cut to the proper shape for the cell. The porosity should be as high as possible and still maintain adequate strength and thermal and electrical conductivity. Suitable commercially available materials of this type are known as Feltmetal or Foam metal. Suitable matrix material may also be conventionally prepared by sintering a sheet prepared from a mixture of metal and organic material such as silver and polyethylene.

The porous metal sheet 21 is then wrapped or covered, on at least two sides including the two faces, 22 and 23, with a single layer of a thin sheet of metal which will not interfere with the electrochemical reactions of the battery. This layer of grid metal 22 and 23 on each side of the matrix 21 is sealed to the matrix in a conventional manner such as by sweat soldering, sintering or welding. The preferred manner of attaching will depend upon the quantity of units being manufactured and the facilities available.

The resulting plate of porous metal covered on the two faces may, if desired, be indented or grooved, which can be accomplished by pressing in a die, so that the active material will adhere better. This is a conventional practice to achieve better adhesion of the active materials. The negative and the positive active materials are applied to their respective faces by electrodeposition or pasting or sintering in the conventional manner. The method of application depends in part on the particular grid metal and active material involved and the porosity of active materials that is desired. These methods, techniques, and materials are well known in the art.

The porous metal matrix 22 is filled with molten heat sink material, such as beeswax, and usually cooled to room temperature, before further assembly, to solidify the wax. This may be done either before or after the active materials are applied to the grid surfaces. An alternative method of preparation of the bipolar electrode module is to fill the porous plate with the heat sink material, scrape the surfaces and paint them with a conventional conducting paint, such as silver, and then electrodeposit the grid metal on the surfaces.

I claim:
1. The improvement in a bipolar electrode having silver oxide positive active material and zinc negative active material for a pile type AgO-Zn-KOH bipolar battery, the said electrode improvement comprising:
    a. a porous silver sheet;
    b. a grid layer of silver metal attached in sealing relationship to each surface of the said porous sheet;
    c. beeswax;
    d. means for filling the said porous sheet with the said beeswax;
    e. means for applying the said positive active material to one grid layer; and
    f. means for applying the said negative active material to the other said grid layer.
2. The improvement in a bipolar electrode as claimed in claim 1, wherein the said porous silver sheet is sintered silver and polyethylene and the said positive and negative active materials are electrodeposited on the said grids.

* * * * *